United States Patent [19]

Tokumaru et al.

[11] Patent Number: 5,122,825
[45] Date of Patent: Jun. 16, 1992

[54] ZOOM CAMERA

[75] Inventors: Hisashi Tokumaru; Hisayuki Masumoto; Takanobu Omaki; Takehiro Katoh; Yukio Maekawa, all of Osaka, Japan

[73] Assignee: Minolta Camera Kabushiki Kaisha, Osaka, Japan

[21] Appl. No.: 563,823

[22] Filed: Aug. 2, 1990

Related U.S. Application Data

[63] Continuation of Ser. No. 231,438, Aug. 12, 1988, abandoned.

[30] Foreign Application Priority Data

Aug. 12, 1987 [JP] Japan .................. 62-202561
Aug. 12, 1987 [JP] Japan .................. 62-202562

[51] Int. Cl.⁵ ............................................. G03B 13/00
[52] U.S. Cl. ................................. 354/400; 354/195.1
[58] Field of Search .......................... 354/400-409, 354/195.1, 195.12

[56] References Cited

U.S. PATENT DOCUMENTS 4,719,485  1/1988  Shikaumi .................. 354/400

FOREIGN PATENT DOCUMENTS

62-69224   4/1937  Japan .
62-118328  5/1962  Japan .
51-27577   8/1976  Japan .
53-113527 10/1978  Japan .
54-39144   3/1979  Japan .
55-64204   5/1980  Japan .
60-1602    1/1985  Japan .
60-4911    1/1985  Japan .
61-38917   2/1986  Japan .

Primary Examiner—L. T. Hix
Assistant Examiner—David M. Gray
Attorney, Agent, or Firm—Burns, Doane, Swecker & Mathis

[57] ABSTRACT

In a zoom camera having a zoom lens including a variator lens, and a driving system for driving the variator lens, the image magnification is computed in accordance with a predetermined program based on the detected object distance, and such a focal length is computed as to obtain a specified value of image magnification based on the detected object distance and the computed image magnification, and the obtained focal length data is fed to the driving system. As a result, auto-zooming with a suitable image magnification in accordance with the object distance can be achieved.

7 Claims, 6 Drawing Sheets

ZOOM CAMERA

This application is a continuation of application Ser. No. 07/231,438, filed Aug. 12, 1988 now abandoned.

BACKGROUND OF THE INVENTION AND RELATED ART STATEMENT

The present invention relates to a zoom camera in which the image magnification is variable in accordance with the object distance.

Cameras having a zoom lens system capable of photographing with constant image magnification are conventionally known.

For example, in an apparatus shown in Japanese Laid-Open Patent Publication (Tokkaisho) No. 53-113527, a position of a variator lens group with which images of a constant image magnification can be obtained even if the object distance changes is computed and set based on the object distance and the image magnification.

Further, in an art shown in Japanese laid-Open Patent Publication No. 55-64204, the rotation angles and the divisions of scales of a focus ring and a zoom ring respectively are so designed that the two rings can integratedly rotate so as to obtain a constant image magnification. In this prior art publication, it is described that if slightly different image magnifications, not an absolutely fixed one, are preferred, other designs can be made in order to obtain such image magnifications. However, such designs have not been disclosed concretely there.

Further, in the abovementioned two prior arts, no range of the object distance wherein constant image magnification can be obtained has been disclosed.

Further, in an art shown in Japanese Laid-Open Patent Publication No. 54-39144, a compensator lens group can make a predetermined movement different from the movement of a variator lens group so that photographing with constant image magnification can be achieved only by the zooming operation. In this prior art publication, it is described that a constant image magnification is obtained in the range of the photgraphing distance D from 1.5 m to 8.8 m. However, how to treat the image magnification at the photographing distance D below and above this range has not been disclosed.

Further, in an art shown in Japanese Patent Publication (Tokkosho) No. 51-27577, a focus ring and a zoom ring are interlocked with each other by providing a zoom cam between the two rings which meets the relation represented by a formula $M = f/x$ ($M$ = image magnification, $x$ = photographing distance; $f$ = focal length of zoom lens) so that photographing with constant image magnification can be achieved only by the focusing operation. In this prior art published, it is described that a constant image magnification is obtained in the range of the photographing distance D from 2 m to 10 m. However, how to treat the image magnification at the photographing distance D below and above this range has not been disclosed.

Further, in an art shown in Japanese Laid-Open Patent Publication No. 61-38917, the focal length f of a zoom lens is automatically controlled so as to make the value f/D to be constant. And if the photographing distance D is above a range in which zooming is executed interlockedly with auto-focusing, the focal length is controlled to be at the closest zoom position and an indication OUT OF RANGE is displayed.

Further, in an art shown in Japanese Laid-Open Utility Model Publication No. 62-69224, when the photographing distance detected based on a distance measuring signal becomes large, zooming up (closeup) is executed, and when the photographing distance becomes small, zooming has no relation with the photographing distance.

Further, in an art shown in Japanese Laid-Open Patent Publication No. 60-4911, a focusing mechanism and an image magnification changing mechanism are mechanically interlocked, so that the image magnification is set to be high on the longest focal length condition and low on the shortest focal length condition. And an embodiment is described in which a zoom lens with a focal length from 80 mm to 200 mm is used and the focusing mechanism and the image magnification changing mechanism are so interlocked that when the focal length is 80 mm, an object at the object distance of 20 m is in in-focus and when the focal length is 200 mm, an object at the object distance of 40 m is in in-focus.

Further, in an art shown in Japanese Laid-Open Patent Publication No. 62-118328, pictures having a suitable size of object image are obtained based on distance data. And an example is shown in which when an object to be photographed is at a far distance or at a middle distance, a focal length setting switch is turned to a longer focal length, and when an object is at a close distance, it is turned to a shorter focal length.

Futhermore, in an art shown in Japanese Patent Publication No. 60-1602, the focal length is controlled in a feed-back manner by treating logarithms of the constant image magnification, the photographing distance and the focal length.

In this connection, zooming has a relation to the framing of images to be photographed, and it is judged by a print or a negative film whether a zooming is good or bad. However, generally it is very difficult for a user to judge at what focal length position to stop zooming operation. Accordingly, if basic image magnification is proposed to users by setting focal lengths variable according to predetermined program relating to a photographing distance, a more desirable picture can be taken by an easy operation in auto-zooming. And as a result, zooming becomes truly easy to use.

SUMMARY OF THE INVENTION

The present invention is based on the abovementioned background. An object of the present invention is to provide a zoom camera which can make programmed auto-zooming operation throughout the whole range of the photographing distance, so that a user can concentrate his attention on shutter release opportunities and pictures having a suitable size of object image can be obtained.

According to the present invention, a camera having an auto-zooming system is provided in which an image magnification setting means for setting the image magnification in accordance with a predetermined program based on the object distance and the focal length is computed based on a value of the image magnification setting means and the detected object distance so as to obtain a specified image magnification, whereby lens is driven based on the computed focal length. Accordingly, zooming at a suitable image magnification in accordance with an object distance can be executed, pictures having a suitable size of object image can be easily obtained, which is advantageous especially for taking snapshots and portraits. And by the automatization of zooming, a user can concentrate his attention only on seizing shutter release opportunities.

Further, by setting the image magnification in the case of an object being near larger than that in the case of an object being far, the photographic purpose of a beginning user can be more apparently represented in a picture, to increase the convenience to use the zoom camera.

Further, it is judged whether the focal length computed as abovementioned is within the focal length range of the zoom lens, and when it is within the range, the zoom lens is driven to have the computed focal length, and when it is outside the range, the zoom lens is driven with setting the focal length at one end of the focal length range of the zoom lens. Consequently, auto-zooming at a suitable image magnification in accordance with an object distance can be achieved in photographing within the range of usual object distance.

Further, photographing on the near side and the far side outside the focal length range of the zoom lens can be executed at the shortest focal length and the longest focal length of the zoom lens respectively.

DETAILED DESCRIPTION OF PREFERRED EMBODIMENTS OF THE INVENTION

According to the present invention, a zoom camera having a zoom lens including a variator lens group, and a driving system for driving the variator lens group, comprises an object distance detecting means for detecting the distance from the camera to an object to be photographed, an image magnification setting means for setting the image magnification in accordance with a predetermined program based on the object distance, and a computing means for computing such a focal length as to obtain a specified value of image magnification based on output signals from the object distance detecting means and the image magnification setting means and feeding the computed focal length data to the driving system.

With this arrangement, the image magnification varies in accordance with a specified program based on the object distance.

According to the present invention, a zoom camera comprises, in addition to the abovementioned arrangement, a judging means for judging whether the focus length computed by the computing means is within the focal length range of the zoom lens, and means for setting the focal length at one end of focal length range of the zoom lens when the focal length computed by the computing means is judged not to be within the focal length range of the zoom lens, and the driving means is driven by output from the computing means or the focal length setting means.

With this arrangement, in photographing within the focal length range of zoom lens, the image magnification varies in accordance with specified program based on the object distance, and in photographing outside the abovementioned focal length range, the focal length is set at one end of the focal length of the zoom lens.

Now, embodiments of the present invention will be described with reference to the appended drawings.

Figure 1:
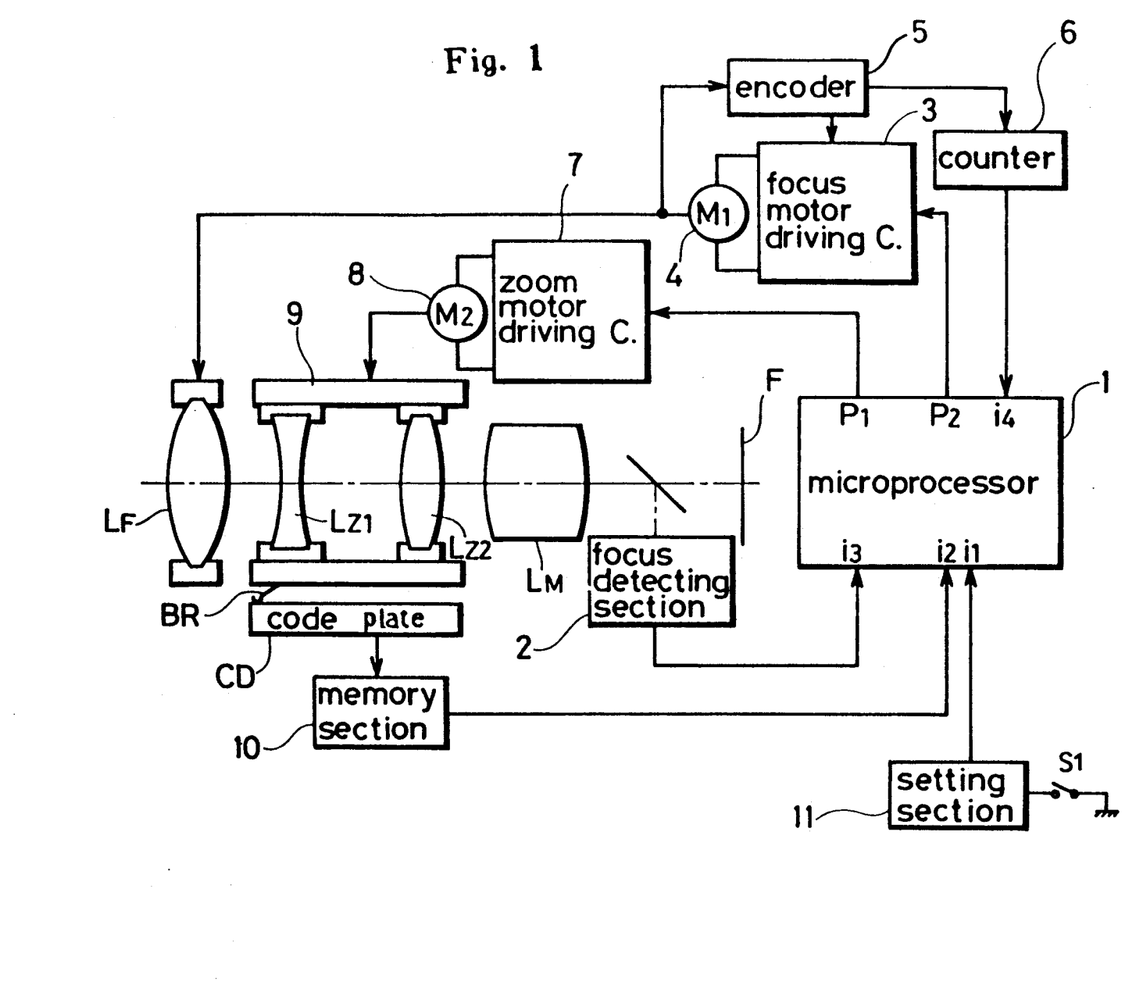
FIG. 1 is a view showing the arrangement of a zoom camera of an embodiment of the present invention.

FIG. 1 shows an arrangement of an embodiment of the present invention. In FIG. 1, a photographing zoom lens is constituted of lens group $L_F$, $L_{Z1}$, $L_{Z2}$, and $L_M$. $L_F$ indicates a focusing lens group. By moving the focusing lens group on the optical axis, objects in positions from the infinitely far position to the nearest photographing position, can be focused. $L_{Z1}$, $L_{Z2}$ indicate a zooming lens group or a variator lens group. By moving the variator lens group $L_{Z1}$, $L_{Z2}$ on the optical axis in specified manners respectively, the focal length of the zooming lens varies from the shortest one to the longest one. $L_M$ indicates a master lens group used for focusing images on a film plane F. A focus detecting section 2 receives a branched bundle of ray passing through exit pupil of the photographing zoom lens and converts analogue data indicative of an amount of received light into digital data to feed them to a microprocessor 1.

A focus motor driving circuit 3 controllingly drives a motor 4 in accordance with a rotation amount signal fed from the microprocessor 1 to move the focusing lens group $L_F$ in the direction of the optical axis thereof. At this time, an encoder 5 monitors the rotation of the motor 4, and feeds a pulse each time the motor 4 is rotated by a predetermined rotation to the focus motor driving circuit 3. The focus motor driving circuit 3 counts the pulses fed from the encoder 5 and stops the drive of the motor 4 when the pulses fed from the encoder reaches the value corresponding to the rotation amount signal fed from the microprocessor 1. A counter 6 counts pulses fed from the encoder 5 generated after the focusing lens group $L_F$ is driven from the lens retraction position ($\infty$) and feeds the count value to the microprocesser 1.

A zoom motor driving circuit 7 receives signals from the microprocessor 1 to drive and control a motor 8 and controls a zoom operating section 9. The zoom operating section 9 moves the variator lens group $L_{Z1}$, $L_{Z2}$ to a specified position by means of moving members such as cams, gears or the like connected to a holding member for holding the variator lens group $Lz_1$, $Lz_2$. The zoom operating section 9 has a brush BR which contacts with a code pattern formed on a code plate CD. The brush BR and the code plate CD constitute an encoder. The encoder issues digital coded data representing the position of the zoom operating section 9, that is, the present focal length of the zoom lens and feeds the digital data to a memory section 10. The memory section 10 is constituted by ROM, which stores focal length data in addresses designated by the digital data and feeds the focal length data stored in the designated address to the microprocessor 1. Further, the memory section 10 stores other lens data peculiar to the camera lens, for example, rotation amount converting data ($\Delta d/\Delta L$), the longest focal length data ($f_F$), and shortest focal length data ($f_N$).

A setting section 11 feeds a mode signal of either usual zooming operation or programmed auto-zooming operation based on a manual operation to a mode switch S1, to the microprocesser 1. In usual zooming operation mode, a manual signal commanding a manually zooming operation to a longer or shorter focal length direction based on a manual operation to zooming direction switches (not shown) is fed through the microprocessor 1 to the zoom motor driving circuit 7 to drive the motor 8. On the other hand, in programmed auto-zooming operation mode, the belowmentioned specified computation is executed in the microprocessor 1, and a control signal is fed to the zoom motor driving circuit 7 to controllingly drive the motor 8.

Now, the output and input data of the microprocessor 1 will be described in the following.

Firstly, the operation mode of the setting section 11 is detected at the input terminal $i_1$. In other words, in programmed auto-zooming operation mode, the mode switch S1 of the setting section 11 is turned ON and a low level signal is fed to the input terminal $i_1$. On the other hand, in usual zooming operation mode, a high level signal is fed thereto. Further, lens data peculiar to the zoom lens and focal length data varying momentarily in accordance with the zooming operation, are successively transferred from the memory section 10 to an input terminal $i_2$ to be successively stored in a memory of the microprocessor 1. And data $\Delta d/\Delta L$, $f_N$, $f_F$, the present focal length data f are stored in memories $M_{21}$, $M_{22}$, $M_{23}$ and $M_{24}$ respectively in this order. Further, digital data from the focus detecting section 2 are fed to an input terminal $i_3$. In accordance with the data input to terminal $i_3$, a defocus amount and the direction thereof are computed in the microprocessor 1. Further, in accordance with the defocus data and the data $\Delta d/\Delta L$ stored in the memory $M_{21}$, the rotation amount is computed. And the count value n of the counter 6 is fed to an input terminal $i_4$.

The microprocessor 1 computes the object distance D from the abovementioned count value n. In other words, the relations between the extension amount $x'$ of the lens, the object distance D and the focal length f are approximately represented by the following formula.

$$f^2/D \simeq x'$$

Here, the count value n of the counter 6 which counts pulses of the encoder 5 from the most retracted position ($\infty$) to the present position of the camera lens and the extension amount $x'$ of the lens are generally in proportion to each other and the following formula is obtained.

$$n = ax' \quad (a = \text{constant})$$

From theses formulas, the following formula can be obtained.

$$1/D = (1/f^2 a) \cdot n$$

When a coefficient determined by each of the camera lens is represented by k, the data $k/f^2a$ is peculiar to the camera lens. Consequently, this data is held in the memory section 10 and fed through the input terminal $i_2$ into the microprocessor 1 to be stored in a memory $M_{27}$. In other words, in the microprocessor 1, the object distance D is computed by substituting the data $k/f^2a$ stored in the memory $M_{27}$ and the count value n of the counter 6 fed to the input terminal $i_4$ into the abovementioned formula, and the computed object distance D is stored in a memory $M_{40}$.

Now, relating to the output data, the focal length $f_P$ is computed based on the object distance D stored in the memory $M_{40}$, and the program diagram $f_P = f(D)$ (described below with reference to FIG. 2), and the computed focal length $f_P$ is stored in the memory $M_{10}$. The difference between the focal length $f_P$ stored in the memory $M_{10}$ and the present focal length f stored in the memory $M_{24}$ is computed and this difference is issued as a zoom motor driving rotational amount signal from an output terminal $P_1$. And a focus motor driving rotational amount signal is transferred from an output terminal $P_2$ to the driving circuit 3.

Figure 2:
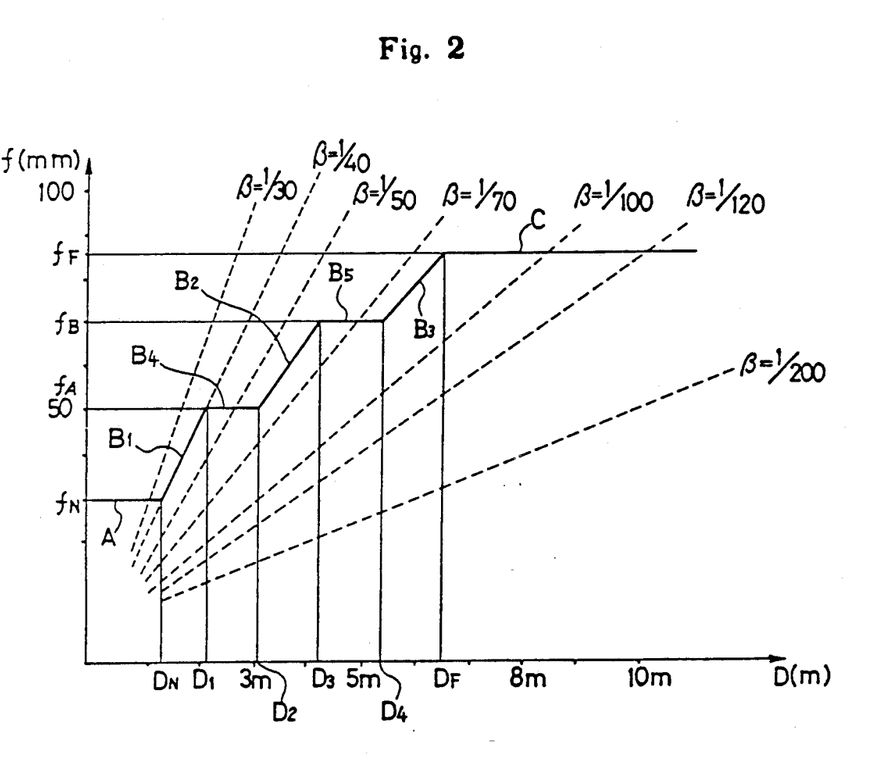
FIG. 2 is a program diagram of the image magnification in relation to the object distance and the focal length in the embodiment of the present invention.

Now, the auto-zooming program will be described. FIG. 2 is a graph showing the relation between the object distance D and the focal length f using the image magnification $\beta$ as a parameter. When D and f change on a chain line, the image magnification $\beta = f/D$ becomes constant.

Here, it will be described with reference to FIG. 3 that the formula $\beta = f/D$ is realized in the optical system shown in FIG. 1.

Figure 3:
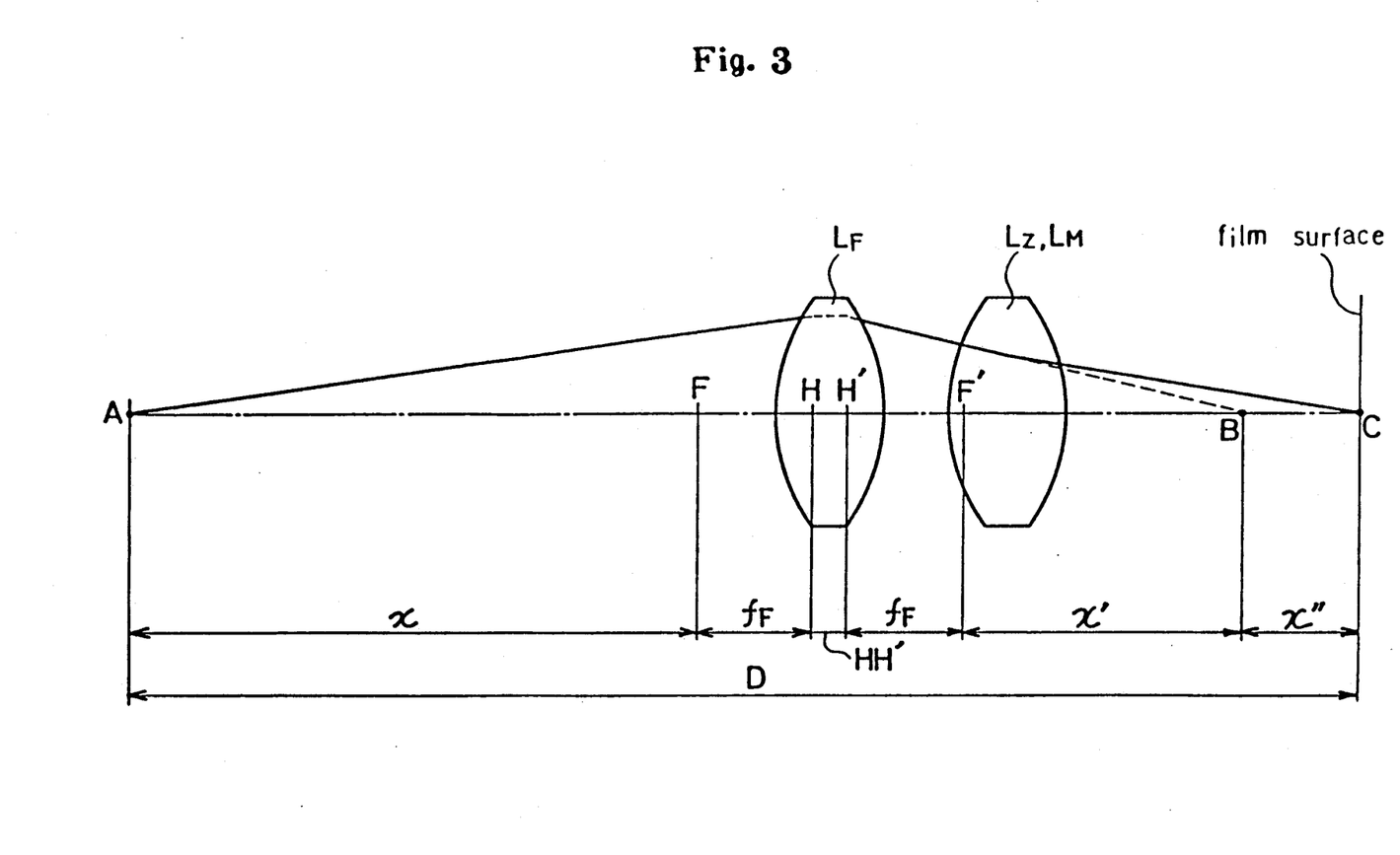
FIG. 3 is a view showing an optical system section for explaining a principle of auto-zooming program.

In FIG. 3, the following formula is obtained.

$$D = x + 2f_F + HH' + x' + x''$$

Here, since $x = f_F/\beta_F$, $x = -f_F \beta_F$, the abovementioned formula is represented by the following formula.

$$\begin{aligned} D &= f_F/\beta_F + 2f_F + HH' - f_F\beta_F + x'' \\ &= f_F(2 + 1/\beta_F - \beta_F) + HH' + x'' \end{aligned}$$

Here, in the case of $\beta < 1/10$, since $2 + 1/\beta_F - \beta_F \approx 1/\beta_F$, $HH' << D$, $x'' << D$, the following formula is obtained.

$$D = f_F/\beta_F$$

Further, since $f = f_F \beta_Z$, $\beta = \beta_F \beta_Z$, a formula $D = f/\beta$ is obtained. When the image magnification of a zoom lens is not extremely large, that is, in usual photographing such as taking a portrait or a snapshot, the relation $\beta = f/D$ is realized.

In FIG. 3, the indications are as follows.
$L_F$: focusing lens group
$f_F$: focal length of focusing lens
HH': axial distance between principal points of focusing lens
$\beta_F$: magnification of focus lens (not shown)
$L_2$: variator lens
$L_M$: master lens
$\beta_Z$: magnification of variator lens and master lens
F,F': focal position of focusing lens
A: position of object point
B: position of image focused by focus lens
D: distance from film plane to object (object distance)
$x''$: distance from image point of focusing lens to film plane
f: focal length of whole system (not shown)
$\beta$: image magnification of whole system (not shown)

Now, returning to FIG. 2, the full line is a program diagram of an embodiment of the present invention. The focal length range is represented by a range from one end $f_F$ mm on the tele side to the other end $f_N$ mm on the wide side. When an object to be photographed is in a position with an object distance smaller than $D_N$ m, it is on a line with the fixed focal length $f_N$ mm (line A in FIG. 2), and the image magnification largely varies. When an object is in a position with an object distance between $D_N$ and $D_F$, the focal length varies with a specified relation to the image magnification based on with the object distance. In other words, when the object distance is $D_N$ on the near side, the focal length is set at the wide side end $f_N$ to make the image magnification $\beta_N = f_N/D_N$. And when the object distance is $D_F$ on the far side, the focal length is set at the tele side end $f_F$ to make the image magnification $\beta_F = f_F/D_F$. The relation between $\beta_N$ and $\beta_F$ is $\beta_N \neq \beta_F$ and $\beta_N > \beta_F$. In other words, when the object is on the near side, a large-size of object image is obtained in a picture, and when the object is on the far side, a small-size of object image is obtained in a picture. However, the image magnification does not so much vary as the object distance varies with the focal length being fixed, but it varies within a small range about a fixed value. The change of the image magnification is such that, in photographing a portrait, the upper half of a human body is photographed in a picture when an object is on the near side and the whole body is photographed when the object is on the far side. A line connecting points $D_N$ and $D_F$ at which $\beta_N > \beta > \beta_F$ is line B in FIG. 2. When an object is in a position having an object distance larger than $D_F$, the image magnification $\beta$ largerly varies on a line C with the fixed focal length $f_F$ mm.

Now, the computation of a program line view $f_p = f(D)$ shown in FIG. 2 will be described in the following. It is considered that the line B represents a formula $f_P = mD + n$. Here, since $$m = (f_F - f_N)/(D_F - D_N)$$

$$n = (f_N D_F - f_F D_N)/(D_F - D_N).$$

and $f = \beta D$, m and n can be represented as follows by using $\beta_N$, $\beta_F$, $D_N$ and $D_F$.

$$m = (\beta_F D_F - \beta_N D_N)/(D_F - D_N)$$

$$n = \{D_N D_F(\beta_N - \beta_F)\}/(D_F - D_N)$$

Line A represents $f_P = f_N$ and line C, $f_P = f_F$. They are also $f_P = \beta_N$, and $f_P = \beta_F D_F$.

Figure 4:
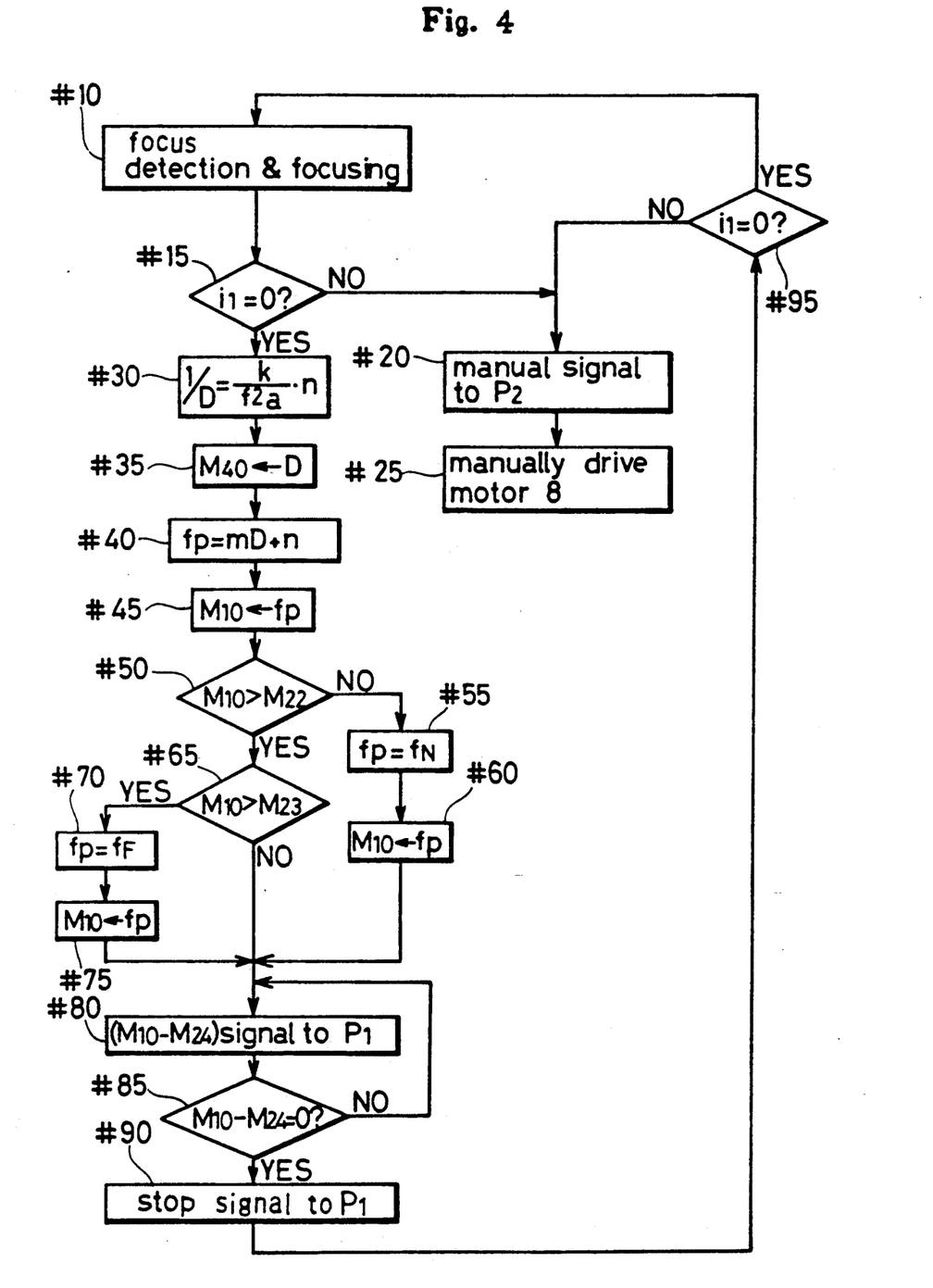
FIG. 4 is a flow chart for executing the auto-zooming program.

Now, an example of operation of the microprocessor 1 executing the abovementioned auto-zooming program will be described with reference to a flow chart of FIG. 4.

10; Focus condition detection is executed based on data from the focus detecting section 2. When the focusing lens group $L_F$ comes to an in in-focus position, the microprocessor 1 stops the rotation of the motor 4. At this time, a count value n of the counter 6 is fed to the input terminal $i_4$.

15; Mode of zooming operation is judged. In usual zooming operation mode, $i_1 = 1$ and a manual signal representing a direction of rotation designated by a manually operating section 11 is fed from $P_1$ to the motor driving circuit 7 to drive the motor 8 in that direction (#20, #25). When $i_1 = 0$, the program goes in programmed auto-zooming operation mode beginning from step #30.

30; The object distance D in the in-focus state is computed based on the count value n of the counter 6 fed to the input terminal $i_4$ and the value $1/f^2a$ of the camera lens fed to the input terminal $i_2$ and stored in the memory $M_{27}$. The value D obtained by the computation is stored in the memory $M_{40}$ (#35).

40; The focal length value $f_P$ on line B in the program diagram of FIG. 2 is computed according to the formula $f_P = mD + n$ and the object distance D stored in the memory $M_{40}$. The obtained value $f_P$ is stored in the memory $M_{10}$ (#45).

50; Then, it is judged whether the value $f_P$ stored in memory $M_{10}$ is larger than the shortest focal length $f_N$ fed to the input terminal $i_2$ and stored in the memory $M_{22}$.

55; When $f_P < f_N$, $f_P$ is set to be $f_N$. $f_N$ instead of $mD + n$ is stored in the memory $M_{10}$ (#60).

65; When $f_p > f_N$, then $f_P$ is similarly compared with the longest focal length $f_F$ at the tele side end stored in the memory $M_{23}$. When $f_p \leq f_F$, $f_P$ is set to be $mD + n$ computed at Step #40 and it is stored in the memory $M_{10}$.

70; When $f_P > f_F$, $f_P$ is set to be $f_F$ and $f_F$ instead of $mD + n$ is stored in the memory $M_{10}$ (#75).

80; A signal of the difference between $f_P$ stored in the memory $M_{10}$ at steps #40 to #75 and the focal length f at the present time fed to the input terminal $i_2$ and stored in the memory $M_{24}$ is fed through the output terminal $P_1$ to the motor driving circuit 7. At this time, when the signal ($M_{10} - M_{24}$) is positive, the motor 8 is driven in the direction increasing the focal length, and when negative the motor 8 is driven in the direction decreasing the focal length.

85; The difference between $f_P$ stored in the memory $M_{10}$ and the present focal length f momentarily varying in accordance with the rotation of the motor 8 fed through the input terminal $i_2$ and stored in the memory $M_{24}$ is detected all the time. When the difference is not 0, the signal ($M_{10} - M_{20}$) is continuously issued from $P_1$ at step #80. When the difference becomes 0, the present focal length becomes a predetermined value $f_P$, and accordingly a signal for stopping the rotation of the motor 8 is issued from $P_1$ to stop the motor 8 (#90).

95; After series of operation is completed at steps #10 to #90 then, it is judged whether $i_1 = 0$ or 1. When $i_1 = 1$, the program is in usual zooming operation mode, and the program advances to step #20. When $i_1 = 0$, the program is in programmed auto-zooming operation mode, and then advances to step #10. At step #10, focus condition detecting operation and auto-focusing operation are executed.

Now, another embodiment of the present invention will be described in the following.

In the abovementioned embodiment, the value $f_P$ stored in the memory $M_{10}$ is compared with the present focal length f fed to the input terminal $i_2$ of the microprocessor 1 based on the digital code issued from the encoder (BR and CD) by the drive of the motor 8. However, this step can be executed in the following manner. The output of the encoder (BR and CD) is fed as a monitor signal to the motor driving circuit 7. And when the rotation amount in correspondence with the difference between the present focal length f issued from the output terminal $P_1$ and fed to the motor driving circuit 7 and the value $f_P$ in the program diagram becomes the rotation amount in accordance with the encoder (BR and CD), the motor driving circuit 7 stops the rotation of the motor 8. In other words, step #80 in the flow chart of FIG. 4 is executed in the motor driving circuit 7.

Further, in the abovementioned embodiment, two points $\beta_N$ and $\beta_F$ on line B in the program diagram of FIG. 2 are connected by a straight line. However, they can be connected by a curved line. In the case of a circle, $(D-a)^2+(f-b)^2=r^2$. And further, curved lines such as a parabola and hyperbola can be used.

Now, another program diagram will be described with reference to FIG. 5. In this embodiment, the image magnification is set to be large with the object distance being on the near side, and to be small with it being on the far side, similarly to the case of the program line diagram view of FIG. 2. However, in FIG. 5, a line in correspondence with line B of FIG. 2 is divided into five segments B1 to B5 and then connected stepwise together.

Relating to segment B1, the object distance varies from $D_N$ to $D_1$, with the image magnification being a fixed value $\beta_1$, the focal length varying from $f_N$ to $f_A$.

Segment B2; the object distance $D_2-D_3$, the image magnification $\beta_2$, and the focal length $f_A-f_B$, and Segment B3; the object distance $D_4-D_F$, the image magnification $\beta_3$ and the focal length $f_B-f_C$.

The relation of the image magnifications with one another is $\beta_1>\beta_2>\beta_3$.

Segment B4; the object distance $D_1-D_2$, the image magnification $\beta_1-\beta_2$, and the focal length $f_A$ (fixed), and Segment B5; the object distance $D_3-D_4$, the image magnification $\beta_2-\beta_3$ and the focal length $f_B$ (fixed).

Figure 5:
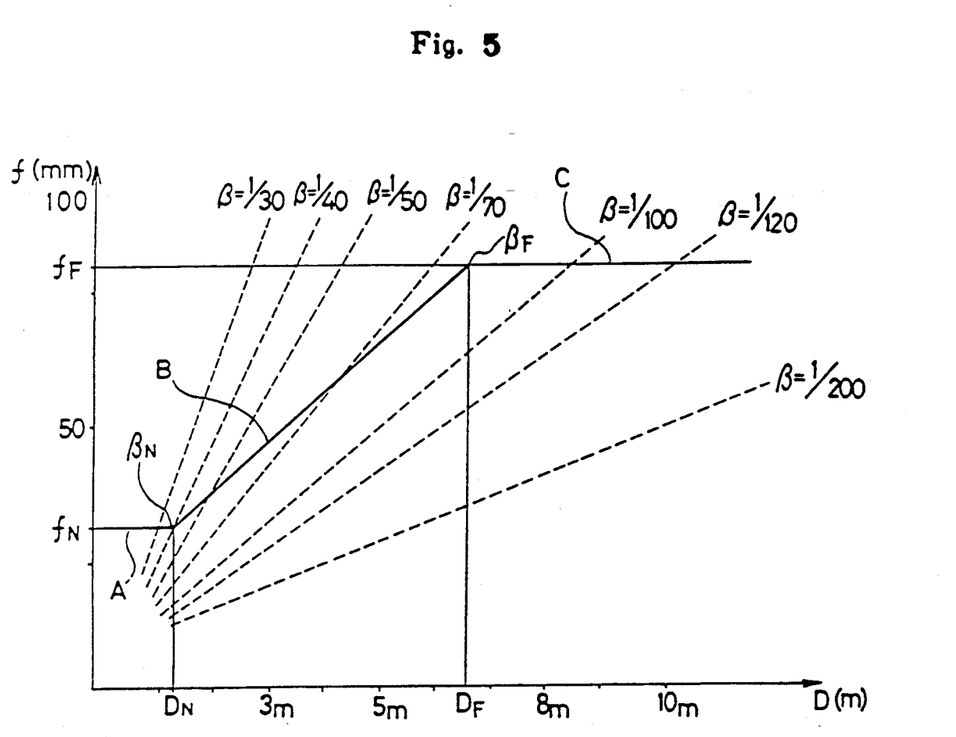
FIG. 5 is a program diagram of another embodiment of the present invention.

The program diagram of FIG. 5 is set as abovementioned.

The arrangement for executing this program is the same as that of FIG. 1. However, the data $f_A$, $f_B$ at the turning points of the program diagram are transferred from the memory section 10 to the input terminal $i_2$ and stored in the memories $M_{25}$, $M_{26}$. An algorithm in the microprocessor 1 is executed according to a flow chart of FIG. 6. Steps #10 to #35 and #80 to #95 are the same as those of FIG. 4. Step #40 to #72 in FIG. 6 will be described in the following.

Figure 6:
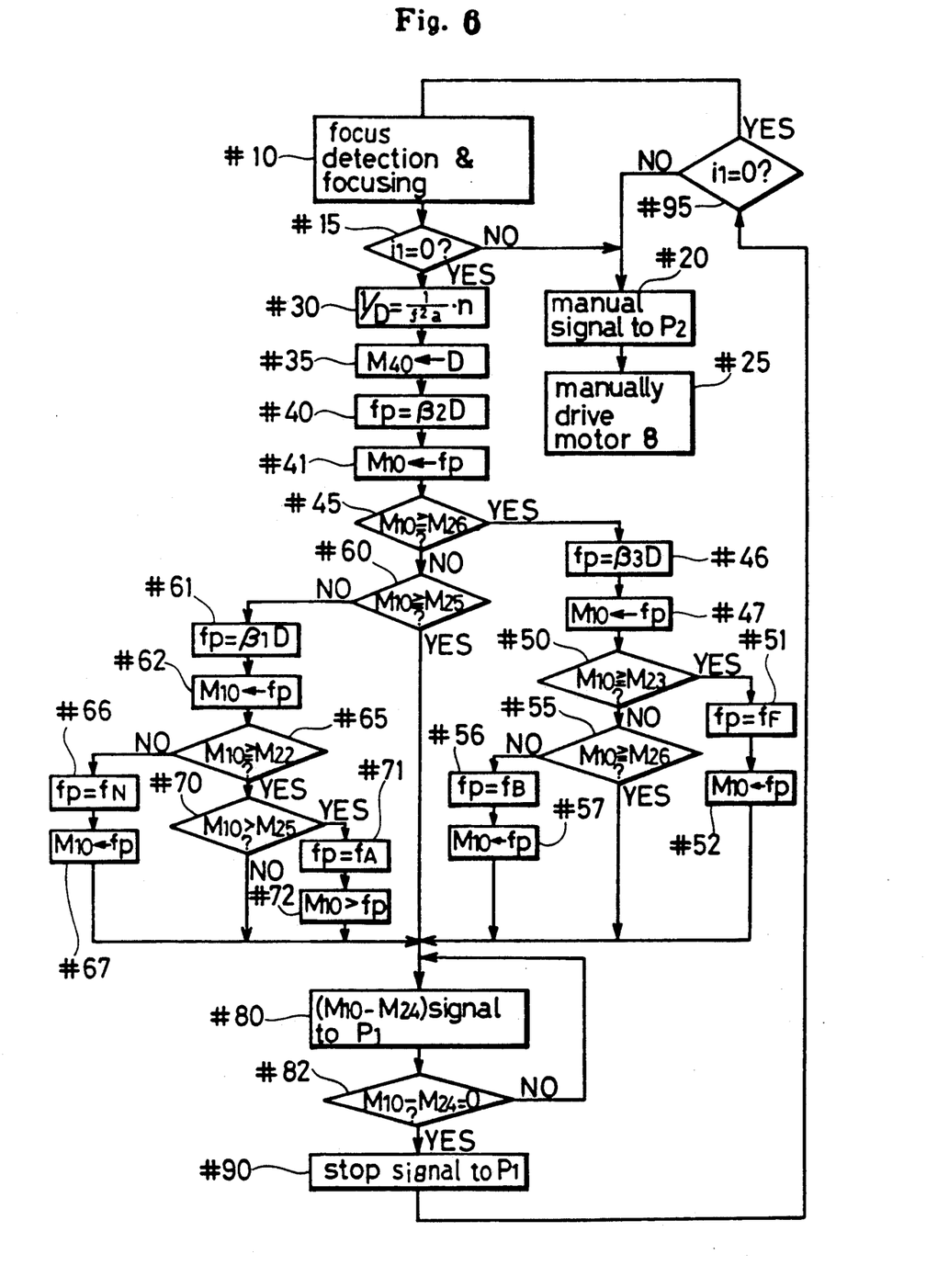
FIG. 6 is a flow chart for executing the program of FIG. 5.

40; In order to judge on which of segments A to C the object distance D stored in the memory $M_{40}$ is, the value $f_P$ is computed according to the formula $f_P=\beta_2 D$, and stored in the memory $M_{10}$ (#41).

45; It is judged whether $f_P$ stored in the memory $M_{10}$ is above the uppermost value $f_B$ of the focal length of segment B2 or not. When $f_P$ is not above $f_B$ and at the same time is not above the lowermost value $f_A$ at Step #60, $f_P$ according to the formula $f_P=\beta_2 D$ is stored in the memory $M_{10}$. Then the program advances to step #80.

46-#50; When $f_P$ is above the uppermost value $f_B$ at step #45, the program advances to #46. $f_P$ is computed according to the formula $f_P=\beta_3 D$ relating to segment B3. Then, it is judged whether $f_P$ is above the longest focal length value $f_F$ of an interchangeable zoom lens or not. When $f_P$ is above $f_F$, $f_P$ is on line C, and therefore $f_P$ is set to be $f_F$ at steps #51, 52 and this value is stored in the memory $M_{10}$. Then the program advances to step #80.

55; When $f_P$ is not above $f_F$ at step #50, $f_P$ is then compared with $f_B$. When $f_P$ is above $f_B$, the image magnification in correspondence with the object distance D is on segment B3. Consequently, $f_P$ according to the formula $f_P=\beta_3 D$ is stored in the memory $M_{10}$ and the program advances to step #80. When $f_P$ is not above $f_B$, the program advances to step #56.

56, #57; When $f_P$ is not above $f_B$ at step #55, this is a case in which $f_P$ in the formula $f_P=\beta_2 D$ at step #45 is above or equal to $f_B$. Consequently, $f_P$ is considered to be on segment B5 and $f_P$ is set to be $f_B$. This value is stored in the memory $M_{10}$ and the program advances to step #80.

61-#65; When $f_P$ in the formula $f_P=\beta_2 D$ is below $f_A$ at step #60, $f_P$ is computed according to the formula $f_P=\beta_1 D$ (#61). The obtained value $f_P$ is stored in the memory $M_{10}$ (#62). Then, it is judged whether $f_P$ is above the shortest focal length value $f_N$ of the interchangeable lens or not (#65). When $f_P$ is below $f_N$, it is on line A. Consequently, $f_P$ is set to be $f_N$ and this value is stored in the memory $M_{10}$ at steps #66, #67. The program advances to step #80.

70; When $f_P$ is above or equal to $f_N$ at step #65, $f_P$ is then compared with $f_A$. When $f_P$ is not above $f_A$, the image magnification in correspondance with D is considered to be on segment B1, and the program advances to step #80.

71, #72; When $f_P$ is above $f_A$ at step #70, this is considered to be in a flow in which $f_P$ in the formula $f_P=\beta_2 D$ is below $f_A$ at step #60, and to be on segment B4. Then, $f_P$ is set to be $f_A$, and this value is stored in the memory $M_{10}$. The program advances to step #80. Steps following to step #80 are the same as those of FIG. 4.

While the embodiments of the present invention, as herein disclosed, constitute a prefferred form, it is to be understood that other forms might be adopted.

What is claimed is:

1. A zoom camera comprising, a zoom lens including a variator lens group and having a focal length range, a driving system for driving the variator lens group, object distance detecting means for detecting an object distance from the camera to an object to be photographed, image magnification setting means for setting the image magnification in accordance with a predetermined program based on the object distance, the image magnification being set in such a manner that an image magnification with a small object distance is larger than an image magnification with a large object distance, and computing means for computing such a focal length so as to obtain a specified value of image magnification based on output signals from the object distance detecting means and the image magnification setting means and feeding the obtained focal length data to the driving system.

2. A zoom camera as claimed in claim 1 further comprising, judging means for judging whether the focal length computed by the computing means is within the focal length range of the zoom lens, and means for setting the focal length at one end of the focal length range when the focal length computed by the computing means is judged not to be within the focal length range of the zoom lens, whereby the driving system is driven by outputs of the judging means.

3. A zoom camera as claimed in claim 2, in which the image magnification is set by the image magnification setting means using such a function as to make the image magnification associated with a small object distance larger than the image magnification associated with a large object distance, and the means for setting the focal length is so constructed as to set the focal length at the shortest focal length of the zoom lens when the image magnification is large, and at the longest focal length thereof when the image magnification is small.

4. A zoom camera as claimed in claim 1, wherein a rate of change of the image magnification is slower when the focal length data is within said focal length range than when the focal length data is at the outer limits of said range.

5. A zoom camera as claimed in claim 1, in which the change in focal length is determined in accordance with a predetermined program relating the image magnification to the object distance and the focal length, wherein a rate of change of the image magnification in the case of the object distance being changed when the focal length is changed based on said program is slower than a rate of change of the image magnification in the case of the object distance is changed when the focal length is fixed.

6. A zoom camera comprising:
a zoom lens including a variator lens group;
object distance detecting means for detecting an object distance from the camera to an object to be photographed;
means for inputting the detected object distance and for outputting a focal length, wherein the relationship between the inputted object distance and the focal length to be outputted is predetermined in such a manner that an image magnification with a small object distance is larger than an image magnification with a large object distance; and
means for driving the variator lens group based on the outputted focal length.

7. A zoom camera as claimed in claim 6, wherein a rate of change of the image magnification within a predetermined object distance range in the case of the focal length being changed by said inputting and outputting means is slower than a rate of change of the image magnification in the case of the focal length being fixed.

* * * * *